(12) United States Patent
Huperz et al.

(10) Patent No.: US 9,649,789 B2
(45) Date of Patent: May 16, 2017

(54) DEVICE AND METHOD FOR PRODUCING A SHAPED CONSUMABLE ITEM

(75) Inventors: Frank Huperz, Bergneustadt (DE);
David Marcinkowski, Waldbröl (DE);
Tanja Pack, Reichshof-Allinghausen (DE); Michael Paul, Bergneustadt (DE)

(73) Assignee: Bühler AG, Uzwil (CH)

(*) Notice: Subject to any disclaimer, the term of this patent is extended or adjusted under 35 U.S.C. 154(b) by 238 days.

(21) Appl. No.: 14/116,626

(22) PCT Filed: May 11, 2012

(86) PCT No.: PCT/EP2012/058720
§ 371 (c)(1),
(2), (4) Date: Nov. 8, 2013

(87) PCT Pub. No.: WO2012/152904
PCT Pub. Date: Nov. 15, 2012

(65) Prior Publication Data
US 2014/0070438 A1    Mar. 13, 2014

(30) Foreign Application Priority Data
May 11, 2011 (EP) ..................................... 11165692

(51) Int. Cl.
*B29C 39/42* (2006.01)
*A23G 1/00* (2006.01)
(Continued)

(52) U.S. Cl.
CPC ............ *B29C 39/42* (2013.01); *A23G 1/0076* (2013.01); *A23G 1/21* (2013.01); *A23G 3/0029* (2013.01);
(Continued)

(58) Field of Classification Search
CPC ... A23G 1/21; A23G 1/22; A23G 1/28; A23G 3/0263; A23G 3/0247; A23G 1/0076;
(Continued)

(56) References Cited

U.S. PATENT DOCUMENTS 5,855,928 A * 1/1999 Takagi ................ B29C 45/2632
425/190
5,918,767 A  7/1999 McGill
(Continued)

FOREIGN PATENT DOCUMENTS

DE    102005004690 A1 *  8/2006  ........... A23G 7/0093
DE    102005009410       9/2006
(Continued)

OTHER PUBLICATIONS

Translation for SU1018752.*
(Continued)

*Primary Examiner* — Alison L Hindenlang
*Assistant Examiner* — Mohamed K Ahmed Ali
(74) *Attorney, Agent, or Firm* — Davis & Bujold PLLC; Michael J. Bujold

(57) ABSTRACT

The invention relates to a device (1) for producing shaped consumable items from a fat mass, in particular a fat mass containing cocoa or a chocolate-like fat mass, comprising a housing (2) and at least one stamping plate (10) having at least one temperature-controllable stamp (13). The stamping plate (10) can be moved out of the housing (2) in order to clean or replace the stamping plate. The invention further relates to methods for cleaning and for replacing stamping plates (10) having at least one temperature-controlled stamp (13).

13 Claims, 2 Drawing Sheets

Figure 1:
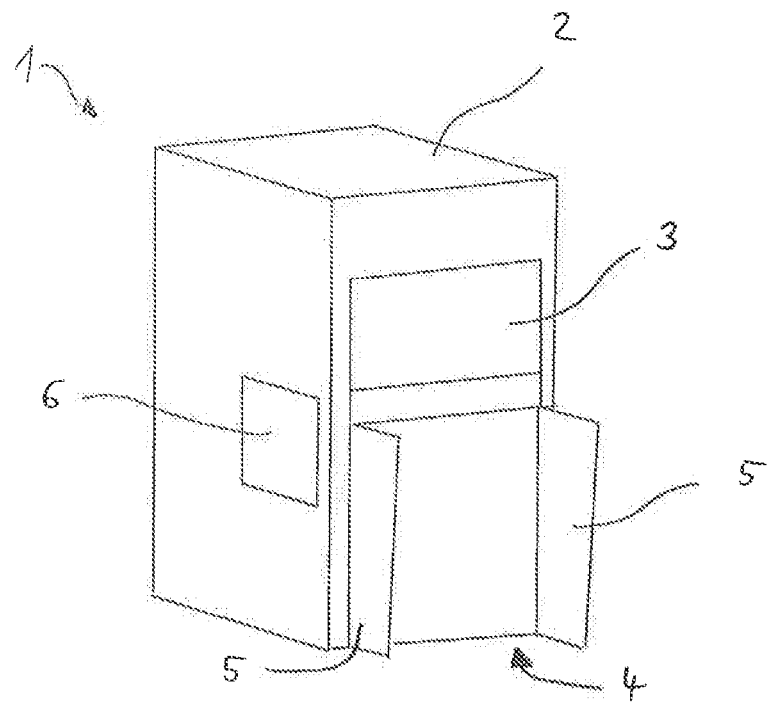

(51) Int. Cl.
*A23G 1/21* (2006.01)
*A23G 3/34* (2006.01)
*A23G 3/02* (2006.01)
*B08B 1/00* (2006.01)
*B08B 3/08* (2006.01)

(52) U.S. Cl.
CPC ............ *A23G 3/0263* (2013.01); *B08B 1/005* (2013.01); *B08B 3/08* (2013.01)

(58) Field of Classification Search
CPC ...... B29C 2043/563; B29C 2043/3615; B29C 2033/426
USPC .................................... 425/144, 225; 264/39
See application file for complete search history.

(56) References Cited

U.S. PATENT DOCUMENTS

| | | | | |
|---|---|---|---|---|
| 6,268,006 | B1* | 7/2001 | Knobel | ............... A23G 1/0076 426/515 |
| 6,537,454 | B1* | 3/2003 | Bacher | ................. B29C 47/682 210/186 |
| 6,628,006 | B2* | 9/2003 | Oglesby | ............. B60L 11/1881 290/1 R |
| 7,836,842 | B2 | 11/2010 | Hasegawa et al. | |
| 2003/0075830 | A1* | 4/2003 | Sollich | ................. A23G 3/0034 264/313 |
| 2004/0144261 | A1 | 7/2004 | Refer | |
| 2007/0110858 | A1* | 5/2007 | Fiori | .................... A23G 1/0076 426/306 |
| 2011/0069361 | A1* | 3/2011 | Jun | ....................... B29C 45/372 359/2 |

FOREIGN PATENT DOCUMENTS

| | | |
|---|---|---|
| DE | 102005015052 | 10/2006 |
| DE | 102005018417 | 11/2006 |
| DE | 102006060961 | 7/2007 |
| EP | 0981280 | 3/2000 |
| EP | 1555886 | 7/2005 |
| JP | 2006026592 A | 2/2006 |
| JP | 2006256700 A | 9/2006 |
| JP | 2009065910 A | 4/2009 |
| JP | 2010127524 A | 6/2010 |
| SU | 1018752 A1 * | 5/1983 |
| WO | 98/52425 | 11/1998 |
| WO | 2007/079599 | 7/2007 |

OTHER PUBLICATIONS

Translation for DE102005004690.*
Web page of NIKKOH.CO., LTD. https://webarchive.org/web/20100213014828/http://nikkoh-web.com/muscat2, onliine Feb. 13, 2010 (with English Translation).
Japanese Office Action corresponding to PCT/EP2012/058720 dated Sep. 7, 2015 (to follow).
Japanese Office Action issued in corresponding Japanese Patent Appln. No. 2014-509748 dated May 31, 2016, 5 Pages.

* cited by examiner

DEVICE AND METHOD FOR PRODUCING A SHAPED CONSUMABLE ITEM

The invention relates to an apparatus and to a method for producing a shaped consumable item from a fatty substance, in particular a cocoa-containing or chocolate-like fatty substance.

In such a method, firstly a multiplicity of pouring molds are filled with the fatty substance in a fluid, temperature-controlled state, whereupon cooled stamps are guided into the filled pouring molds and shape the fatty substance and allow it to at least partially solidify, in particular to form a husk. Then, the stamps are moved away from the substance, after which the shaped and solidified fatty substance is removed from the pouring molds, possibly after further processing steps. These steps can be carried out again on the emptied pouring molds.

The cold stamping systems used for this comprise a multiplicity of coolable stamps, as are known for instance from EP0981280. The stamps are preferably produced from thermally conductive material, and the dew point of the atmosphere surrounding the consumable item is kept below the temperature of the stamps so that no condensate forms on the stamps. This is generally achieved by virtue of the fact that dry air, also called dried air or drying air, is fed to the surroundings.

It is generally the case that the solidified fatty substance remains completely and therefore satisfactorily in the molds, but it may occasionally be the case that residues of the solidified fatty substance remain on the stamps. In most cases, these detach again in a following shaping process. If this does not occur, the forming may be impaired when reshaping the fatty substance. In order to prevent this, the stamps in such a system are subjected to cleaning as soon as it is established that the solidified fatty substance does not have the desired shape.

The residues remaining on the stamps are removed with a tool, for example a scraper. In order that the smooth procedure is maintained, the cleaning is generally carried out during operation and has to be done very quickly.

For this purpose, the operator generally opens the housing of the cold stamping system, in which case moist air passes into the surroundings of the stamps and undesirable condensation can arise.

If the size of the system allows it, the operator can go into the housing and close the housing again behind them. To this end, however, the required safety and hygiene requirements have to be satisfied, which in many cases is difficult to impossible.

In the case of relatively small systems, it is impossible to enter these anyway.

DE 10 2005 009 410 discloses a cold stamping system, wherein the stamps are arranged inside a stamping space with a dryer for a gaseous medium. When the door of the stamping space is opened for inspection or maintenance purposes, an increased quantity of dried air flows out, and therefore the pressure is maintained even with an open door.

The system requires a control device for determining the drying air requirement and a large quantity of drying air when the door remains open for a longer period of time. The system is therefore complicated and has a high energy consumption.

In order to prevent condensate formation and also to remove condensate, the stamps can be sprayed with an alcohol. However, this itself forms an undesirable intermediate layer between the stamps and the fatty substance.

The same problem also arises when replacing the stamps. If a new stamping plate is installed, this generally requires the housing to be opened. In the process, the surroundings of the stamps become mixed with ambient air, as a result of which condensate formation can readily occur on the cooled stamp.

EP 1 555 886 describes an apparatus in which a housing is dispensed with entirely. In order to prevent the formation of condensed water on the stamps, dried air is blown at the stamps as soon as the stamps are detached from the molds. Since, in the case of this apparatus, production takes place without protection from ambient air, there are risks in terms of hygiene. Moreover, a very large amount of drying air is required during operation of this device, too, which consumes a very large quantity of energy and is therefore unfavorable.

The invention is based on the object of avoiding the disadvantages of the prior art and, in the case of the apparatus described in the introduction, of reducing the effort for cleaning and also for replacing stamping plates and of making operation more convenient.

The apparatus according to the invention for producing shaped consumable items from a fatty substance, in particular a cocoa-containing or chocolate-like fatty substance, comprises a housing and at least one stamping plate. The stamping plate has at least one temperature-controllable stamp.

According to the invention, the stamping plate can be moved, in particular can be slid, from a working position, in which the at least one temperature-controllable stamp can be introduced into at least one pouring mold, wherein the stamping plate can preferably be moved, in particular can be slid, out of the housing.

As a result of the at least one stamping plate being moved out, it is possible for the at least one stamp to be cleaned without a person having to enter or reach into the housing. This reduces the work required for cleaning and increases hygiene. In addition, the work required for replacing the at least one stamping plate is also reduced considerably.

Since the stamping plate can be moved out of the housing and moved into the housing quickly, the loss of drying air during cleaning or replacement is additionally only very small.

It is preferable that the housing surrounds the stamping plate completely. This makes it possible to operate the stamping plate in a controlled atmosphere. In particular, the temperature and also the moisture content of the air inside the housing can be kept within specific and defined values. Moreover, the air can be filtered and/or sterilized before it is fed into the housing in order to observe hygiene regulations.

The apparatus preferably comprises further components inside the housing, in particular at least one pouring mold, into which a fatty or chocolate substance can be poured and the at least one stamp can be introduced, in order to shape the fatty or chocolate substance to form a husk.

It is particularly preferable that the apparatus has a conveying apparatus, in particular a conveyor belt, a roller conveyor and/or a chain conveyor. On account of the conveying apparatus, pouring molds can be guided continuously past the stamping plate, which increases the productivity of the apparatus. Alternatively, the apparatus is configured in such a way that a conveying apparatus can be connected.

The housing preferably has at least one passage, through which the at least one pouring mold can be introduced into the housing, in particular by the conveying apparatus. It is particularly preferable that this at least one passage is configured in such a manner that an exchange of the air inside the housing with the ambient air outside the housing is avoided as far as possible. This can be achieved, for example, by the smallest possible passage or by a flap which opens only for the introduction of a pouring mold. Alternatively, a strip curtain or a panel gate can also be used, or an overpressure can be generated inside the housing. By avoiding the air exchange, only a very small proportion of the drying air is lost, which makes energetically favorable operation of the apparatus possible.

It is particularly preferable that the apparatus has a conveying means, which introduces pouring molds continuously into the housing through a first passage, guides them past the stamping plate and then guides them out of the housing again through a second passage. This makes it possible for the apparatus according to the invention to be installed in a production line for consumable items.

The apparatus preferably has one stamping plate. Alternatively, the apparatus can also comprise more than one stamping plate. This makes it possible to increase the production speed. In this case, the stamping plates can be arranged both in series in succession and in parallel alongside one another.

The at least one stamp is temperature-controllable. In this respect, it is preferable that a cooling liquid is conducted through a channel in the at least one stamp. The cooling liquid allows the at least one stamp to be cooled to a specific temperature or a temperature range. Alternatively, the at least one stamp can also be cooled electrically, e.g. by a Peltier element. This leads in a known manner to quicker solidification of the fatty or chocolate substance in the pouring mold. It is particularly preferable that the at least one stamping plate has possible connections, in order to connect this to a cooling liquid circuit. The cooling liquid circuit is preferably a component part of the apparatus.

The apparatus preferably has means for moving, in particular for sliding, the stamping plate from a working position, in which the at least one stamp can be introduced into at least one pouring mold. In this case, the at least one stamping plate is preferably moved, for example lifted or pushed, out of the housing. These means are, for example, rails, plain bearings or the like. Alternatively, the stamping plate can also be pivoted from the housing by a pivoting apparatus.

In order to ensure that the temperature-controlled stamps are cooled with as little interruption as possible, the stamping plate preferably remains connected to the cooling liquid circuit even when it has been moved out. This can be effected by a sufficiently long and flexible connection to the cooling circuit, e.g. by means of a flexible hose or the like. Alternatively, the housing can have corresponding possible connections on the outer side, which make it possible to connect the stamping plate to the cooling liquid circuit when it has been moved out. In this case, the stamping plate would merely have to be separated briefly from the cooling liquid circuit as it is being moved out.

Preferably, dried air is blown at the at least one stamp of the at least one stamping plate, when in the moved-out position, by way of at least one feed line. This prevents condensed water from forming on the at least one temperature-controlled stamp. It is particularly preferable that the feed line is configured in such a manner that a curtain of drying air forms on the at least one stamping plate. This can be achieved, for example, by arranging a plurality of air nozzles on two opposing sides of the stamping plate.

In addition or as an alternative, a space can be provided outside the housing, into which space the at least one stamping plate can be moved out and which space can be subjected to dried air. The drying air can be guided directly onto the stamping plate by way of nozzles, or the space has at least one supply opening, by way of which dry ventilation is made possible, for example in the form of a ventilation grille.

The space is in particular at least partially closable. That is to say that the space is preferably delimited by walls, which prevent exchange of the drying air with the ambient air or at least keep it to a minimum. It is preferable that one wall of the space is formed by a housing outer wall.

The space is preferably delimited by at least one wall in which, in particular, at least one ventilation grille is provided for feeding in drying air.

The space can be delimited by walls from all sides, in which case at least one wall is transparent or has a window, so that the stamping plate can be visually monitored.

The space preferably has an open side or a wall which can be opened in order to allow access to the stamping plate.

The space can be provided as a separate lock which is formed independently of the housing and is attached to the housing when the stamping plate is to be guided from the housing.

Walls of the space can be fastened to the housing in a foldable and/or slidable manner, e.g. in the form of door elements which are opened and oriented before the stamping plate is slid from the housing.

In particular, one or more ventilation grilles for the application of dried air can be arranged in or on the housing in such a manner that the space to be subjected to drying air is formed before or during extraction of the stamping plate from the housing.

By way of example, walls with supply means for drying air, in particular ventilation slots, can be extractable from the housing together with the stamping plate.

The same supply means for drying air, in particular ventilation slots, can also ensure that the stamping plate is subjected to drying air during stamp operation inside the housing.

The stamping plate is preferably fitted to telescopic rails. This makes simple extraction of the stamping plate possible. Since the rails are located entirely in the housing after the stamping plate has been pushed in, the apparatus can have a space-saving configuration. Furthermore, it is particularly preferable that the stamping plate is fastened to the telescopic rails by eccentric bolts. The stamping plate can thereby be released particularly easily and simply, making efficient replacement of the stamping plate possible.

The housing preferably has a closable opening, wherein the stamping plate is formed and can be moved out of the opening in such a manner that the stamping plate which has been moved out closes the opening. Even when the plate has been moved out, this makes it possible to efficiently prevent the exchange of air from the interior of the housing with the ambient air outside the housing. It is particularly preferable in this case that the opening is configured in such a manner that one side of the stamping plate which has been slid out closes the opening flush. Alternatively, a closure element can be fitted, for example, to the telescopic rails and concomitantly moves when the stamping plate is being extracted, in order to close the opening.

In the moved-out position, the stamping plate is preferably additionally rotatable about an axis transverse to the direction in which it is moved out. This makes it possible, for example, to erect the stamping plate or to position it vertically, facilitating the cleaning thereof considerably.

It is important in this respect that the supply means which are present for drying air rotate together with the stamping plate, such that drying air can also be blown onto the at least one stamp when it is in a rotated position.

Alternatively, after rotating, the stamps of the stamping plate face into a space which can be subjected to drying air.

The apparatus preferably has a maintenance apparatus, which is located outside the housing and is preferably attached to the housing. A receptacle for the stamping plate and the feed line for the drying air are arranged in the maintenance apparatus.

The drying air can be guided directly onto the stamping plate by way of nozzles arranged in the maintenance apparatus, or the maintenance apparatus comprises a space which can be subjected to drying air, for example by way of ventilation grilles.

The maintenance apparatus can be configured, for example, as a recess in one of the housing walls. Furthermore, the maintenance apparatus can also have further apparatuses, e.g. brackets for cleaning and maintenance tools or the like. The receptacle for the stamping plate can be configured, for example, as a fixation element for telescopic rails or other means for moving the stamping plate.

The maintenance apparatus is closed partially or entirely by at least one wall, so that no or only a small air exchange takes place with the ambient air outside the maintenance apparatus. This increases the efficiency of the drying air supply and helps to prevent the formation of condensed water or ice. Moreover, the contact between the stamping plates and unfiltered and/or unsterilized air is reduced, which additionally increases hygiene.

The apparatus preferably comprises a drying air system, which supplies the housing interior and the drying air feed line of the maintenance apparatus with drying air. The drying air system can in this case also have additional filtering and/or sterilization elements and also optionally coolers or heaters for precooling or preheating the drying air.

In particular, drying air which is conducted into a space subjected to drying air beneath a stamping plate can be heated compared to the air surrounding the stamps, so that the drying air ascends toward the stamping plate.

Alternatively, the drying air can be cooled in order to contribute in a targeted manner to the continuation of the cooling of the stamps during the cleaning or maintenance phase.

A further aspect of the present invention relates to a maintenance apparatus which can be fitted to or can be guidable onto an apparatus for producing shaped consumable items from a fatty substance.

The maintenance apparatus according to the invention has a feed line for drying air and also a receptacle for a stamping plate.

The drying air can be guided directly onto the stamping plate by way of nozzles arranged in the maintenance apparatus, or the maintenance apparatus comprises a space which can be subjected to drying air, for example by way of ventilation grilles.

The maintenance device can have a dedicated drying air system or can be supplied from the drying air system which also supplies the interior of the housing with drying air.

The maintenance apparatus can be positioned in such a manner that a stamping plate located in the receptacle is not located above a pouring mold or a conveying apparatus.

The stamping plate is preferably movable, in particular slidable, from an apparatus for producing shaped consumable items from a fatty substance. Alternatively, the stamping plate is also removable from the apparatus.

A stamping plate which is moved into the maintenance apparatus for cleaning purposes, for maintenance purposes or for transportation to a different site can be protected against the formation of condensed water by the application of drying air in the maintenance apparatus.

The maintenance apparatus is preferably closed partially or entirely by at least one wall, so that no or only a small air exchange takes place with the ambient air outside the maintenance apparatus. This increases the efficiency of the drying air supply and helps to prevent the formation of condensed water. Moreover, the contact between the stamping plates and unfiltered and/or unsterilized air is reduced, which additionally increases hygiene. Moreover, the quantity of drying air required is reduced to a minimum.

The maintenance apparatus preferably additionally has a connection for a coolant, which can be coupled to a stamping plate. This makes it possible to achieve uninterrupted cooling of the at least one stamp even when the stamping plate is in the moved-out state.

It is preferable that the maintenance apparatus additionally has a rolling cart, in particular a lifting cart, for receiving a stamping plate. The rolling cart preferably has a protective box for protecting the stamps against damage. The stamping plate which is used can be replaced relatively easily and efficiently by virtue of the rolling cart. Alternatively, other common forklift trucks, for example fork stackers, can also be used for replacing the stamping plate.

A further object of the present invention is that of providing a method in which a stamping plate having at least one temperature-controlled stamp can be cleaned easily and efficiently and which avoids the disadvantages of the known cleaning methods.

In a first step of the method according to the invention for cleaning at least one temperature-controlled stamp, which is located on a stamping plate, in an apparatus for producing shaped consumable items from a fatty substance, in particular a cocoa-containing and/or chocolate-like fatty substance, the stamping plate is moved out, in particular is slid out, of the housing. This can be effected, for example, by way of means, such as rails or plain bearings, which are suitable for this purpose and are fitted in the apparatus.

After the stamping plate has been moved out, the at least one stamp is cleaned. This can be effected in a conventional manner by scraping fatty or chocolate substance residues away from the at least one stamp. Alternatively, the cleaning could also be effected in a different way, for example by spraying on a cleaning liquid.

After the cleaning, the stamping plate is moved back into the housing.

It is preferable that the stamping plate, before it is moved out, is initially uncoupled from coolant supply lines. After the stamping plate has been moved in, it is correspondingly recoupled to the coolant supply lines.

The cleaning preferably takes place with the stamping plate being subjected to drying air.

In a further method according to the invention for cleaning a stamp, which is located on a stamping plate, in an apparatus for producing shaped consumable items from a fatty substance, in particular a cocoa-containing or chocolate-like fatty substance, the stamping plate is brought into a maintenance apparatus, in particular according to the present invention, for cleaning. In this maintenance apparatus, the stamping plate is subjected to drying air, in particular drying air is blown at it. This prevents the formation of condensed water on the stamping plate.

To provide the drying air in the maintenance apparatus, it is preferable that drying air is branched off from the housing of the apparatus or is taken from a drying air supply line or return line of a drying air circuit of the housing.

A further object of the present invention is that of providing a method for replacing a stamping plate having at least one temperature-controllable stamp, in an apparatus, in particular according to the present invention, for producing shaped consumable items from a fatty substance, in particular a cocoa-containing and/or chocolate-like fatty substance, having a housing.

In a first step of the method according to the invention, a replacement stamping plate is made available in a maintenance apparatus, in particular according to the present invention. Then, a used stamping plate is slid out of the housing of the apparatus into the maintenance apparatus. In the maintenance apparatus, drying air is blown at the replacement stamping plate and/or the replacement stamping plate is cooled by way of cooling lines. In the last step of the method, the replacement stamping plate is slid into the housing.

One or more replacement stamping plates can also be mounted inside the housing of an apparatus, as described above. For activation, the replacement stamping plate has to be brought into the operating position. To this end, the apparatus can have means which make simple replacement of the stamping plates possible, for example rails or the like.

Within the housing, the replacement stamping plate experiences conditions which prevent fogging with condensed water.

To be made ready, the replacement stamping plate can likewise be slid out of the housing, with drying air preferably being blown at said replacement stamping plate in the slid-out position, in particular in a maintenance apparatus according to the present invention.

Further details and embodiments of the present invention can be gathered from the following examples and figures.

Figure 2:
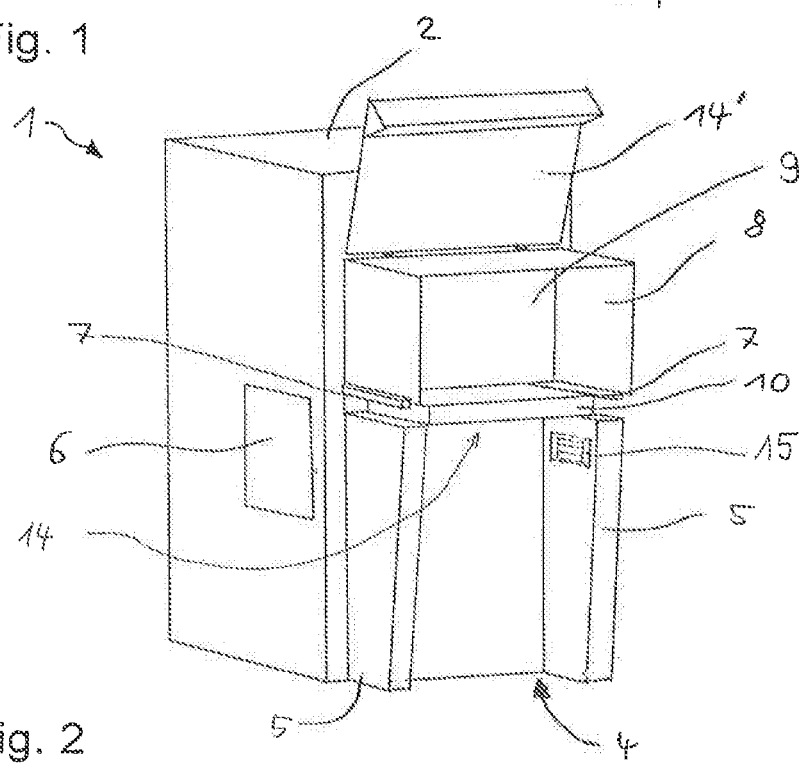

FIG. 1: shows a perspective view of an embodiment of an apparatus according to the invention;

FIG. 2: shows a perspective view of the apparatus shown in FIG. 1 with a pulled-out stamping plate; and FIG. 3: shows a view of the stamping plate when pulled out from below.

FIG. 1 shows a perspective view of an apparatus 1 according to the invention. The apparatus 1 comprises a housing 2 with an opening 3 and also a passage 6. The passage 6 is configured in such a manner that pouring molds can pass into the interior of the housing 2 without there being a significant exchange of air from the inside of the housing 2 with the ambient air outside the housing 2. By way of example, the passage 6 can have a strip curtain or a panel gate. Furthermore, a maintenance apparatus 4 is arranged under the opening 3 and is partially closed by walls 5.

FIG. 2 shows a perspective illustration of the example for an apparatus shown in FIG. 1 with a pulled-out stamping plate 10. In the shown embodiment of the apparatus 1, the stamping plate 10 is moved from the housing 2 with the aid of telescopic rails 7. To this end, firstly the opening 3 is opened, i.e. in the embodiment shown, a flap 14' is folded out. To protect the stamping plate 10, in this example, a protective structure 8 is additionally moved out of the housing 2 together with the stamping plate 10. In order to close the opening 3 again, a closure element 9 is displaced at the same time as the protective structure 8.

The walls 5 delimit a space 14, which can be subjected to drying air when the stamping plate 10 is slid out of the housing 2. Provision can be made of further walls (not explicitly shown in the drawing) which prevent air exchange with the surrounding space.

A ventilation grille 15 is arranged in a side wall 5 and is used to supply the space 14 with drying air.

A further ventilation grille (not explicitly shown) can be fitted in the opposite side wall.

Figure 3:
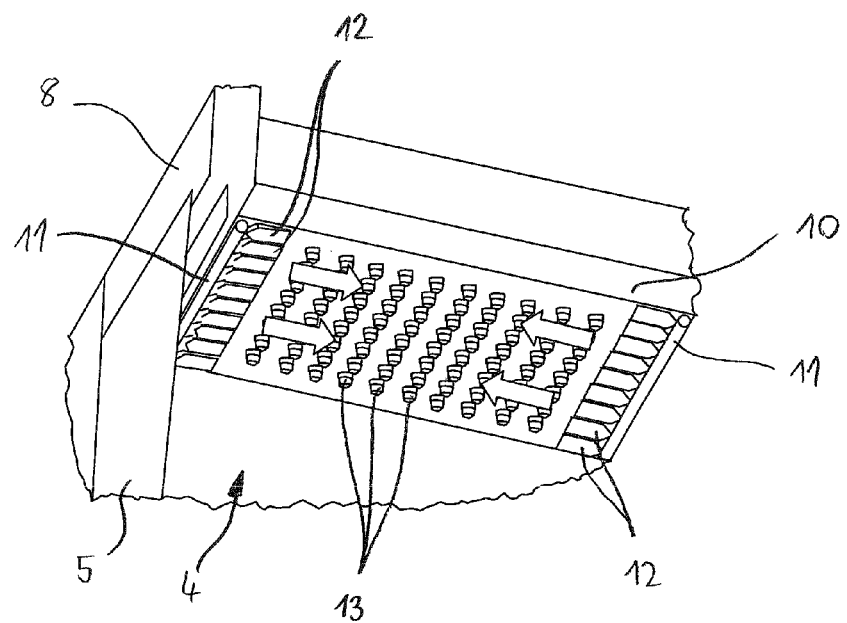

As an alternative and/or in addition, ventilation grilles or other supply means 11, as shown for example in FIG. 3, can be coupled to the stamping plate and can be pulled out therewith.

The pulled-out stamping plate 10 and the walls 5 define a space 14 which can be subjected to drying air and is guidable together with the stamping plate 10 out of the housing.

The walls can be fixed, as in the example shown, or else for example can be hinged like a door, mountable or extractable from the housing.

The ventilation grilles generate a drying air cushion on the stamps of the pulled-out stamping plate 10, which prevents the formation of condensed water.

FIG. 3 shows a perspective view of a stamping plate 10 when moved out. In the example shown, supply means 11 are arranged in the maintenance apparatus 4 and blow drying air at the stamps 13 of the stamping plate 10 by way of nozzles 12. The nozzles 12 are in this case arranged in such a manner that the injected drying air (denoted by the arrows) forms a curtain of drying air along one side of the stamping plate 10.

This prevents the formation of condensed water on the stamps 13.

The invention claimed is:

1. An apparatus for producing shaped consumable items from a fatty substance, the apparatus comprising:
   a housing,
   a closable space being defined outside the housing,
   at least one stamping plate having at least one temperature-controllable stamp,
   a pair of rails facilitating movement of the stamping plate between a working position and a moved-out position located in the closable space,
   wherein the stamping plate is capable of being moved to the working position, in which the at least one temperature-controllable stamp is capable of being Introduced into at least one pouring mold located inside the housing, and
   the stamping plate is capable of being moved to the moved-out position located in the closable space and, when the at least one stamping plate is in the moved-out position, dried air is blown at the at least one stamp by way of at least one drying air feed line, and the closable space being subjected to the dried air.

2. The apparatus as claimed in claim 1, wherein the space is delimited by at least one wall in which at least one ventilation grille is provided for feeding in the dried air.

3. The apparatus as claimed in claim 1, wherein the stamping plate is fitted to telescopic rails.

4. The apparatus as claimed in claim 1, wherein the housing has a closable opening, and the stamping plate is formed and is capable of being moved out of the opening in such a manner that the stamping plate which has been moved out closes the opening.

5. The apparatus as claimed in claim 1, wherein, in the moved-out position, the stamping plate is rotatable about an axis transverse to the direction in which the stamping plate is moved out.

6. The apparatus as claimed in claim 1, wherein the apparatus has a maintenance apparatus, which is located outside the housing, and wherein a receptacle for the stamping plate and the drying air feed line for the dried air are arranged in said maintenance apparatus.

7. The apparatus as claimed in claim 6, wherein the maintenance apparatus is closed partially or entirely by at least one wall, so that no or only a small air exchange takes place with ambient air outside the maintenance apparatus.

8. The apparatus as claimed in claim 6, wherein the apparatus comprises a drying air system, which supplies the housing interior and the drying air feed line of the maintenance apparatus with the dried air.

9. The apparatus as claimed in claim 1, wherein the apparatus has a maintenance apparatus, the maintenance apparatus has the drying air feed line for the dried air and also a receptacle for a stamping plate, and is capable of being positioned in such a manner that the stamping plate located in the receptacle is not located above a pouring mold or a conveying apparatus.

10. The apparatus as claimed in claim 9, wherein the maintenance apparatus is closed partially or entirely by at least one wall, so that no or only a small air exchange takes place with ambient air outside the maintenance apparatus.

11. The apparatus as claimed in claim 9, wherein the maintenance apparatus has a connection for a coolant which is capable of being coupled to the stamping plate.

12. The apparatus as claimed in claim 9, wherein the maintenance apparatus additionally has a rolling cart for receiving the stamping plate.

13. An apparatus for producing shaped consumable items from a fatty substance, the apparatus comprising:
- a housing and at least one stamping plate having at least one temperature-controllable stamp,
- a pair of rails facilitating movement of the stamping plate between a working position and a moved-out position located in a closable space,
- wherein the stamping plate is capable of being moved from the working position, in which the at least one temperature-controllable stamp is capable of being introduced into at least one pouring mold inside the housing,
- the stamping plate is also capable of being moved completely out of the housing into the moved-out position located in the closable space, and
- the closable space being provided outside the housing, and being delimited by at least one wall, into which closable space the at least one stamping plate can be moved out and which closable space being subjected to dried air.

* * * * *